United States Patent
Kinoshita et al.

(10) Patent No.: US 6,902,026 B2
(45) Date of Patent: Jun. 7, 2005

(54) WHEEL TYPE TRAVELING AND OPERATING VEHICLE

(75) Inventors: Yukio Kinoshita, Tsurugashima (JP); Youjirou Ohbatake, Komatsu (JP); Tetsuya Morimoto, Komatsu (JP)

(73) Assignee: Komatsu Ltd. (JP)

( * ) Notice: Subject to any disclaimer, the term of this patent is extended or adjusted under 35 U.S.C. 154(b) by 102 days.

(21) Appl. No.: 10/106,379

(22) Filed: Mar. 27, 2002

(65) Prior Publication Data

US 2002/0139597 A1 Oct. 3, 2002

(30) Foreign Application Priority Data

Apr. 3, 2001 (JP) ...................................... P2001-104211
Mar. 14, 2002 (JP) ...................................... P2002-070671

(51) Int. Cl.[7] .............................................. B60K 1/00
(52) U.S. Cl. ...................................... 180/291; 180/297
(58) Field of Search ................................ 180/297, 291, 180/292, 242, 247

(56) References Cited

U.S. PATENT DOCUMENTS

| | | | | |
|---|---|---|---|---|
| 3,921,742 A | * | 11/1975 | May et al. .................... | 180/234 |
| 5,078,229 A | * | 1/1992 | Kikuchi et al. .............. | 180/248 |
| 5,618,156 A | * | 4/1997 | Brown ......................... | 414/694 |
| 5,687,809 A | * | 11/1997 | Braud ......................... | 180/297 |
| 5,727,921 A | * | 3/1998 | Brown ......................... | 414/694 |
| 5,836,733 A | * | 11/1998 | Moses et al. ................ | 414/685 |
| 6,071,066 A | * | 6/2000 | Braud ......................... | 414/686 |
| 6,155,371 A | * | 12/2000 | Izumi .......................... | 180/292 |
| 6,514,031 B1 | * | 2/2003 | Cook ........................... | 414/685 |
| 2002/0040621 A1 | * | 4/2002 | Braud .................... | 74/665 GA |

FOREIGN PATENT DOCUMENTS

| | | |
|---|---|---|
| JP | 6-211061 | 8/1994 |
| JP | 8-118966 | 5/1996 |

* cited by examiner

*Primary Examiner*—Lesley D. Morris
*Assistant Examiner*—Daniel Yeagley
(74) *Attorney, Agent, or Firm*—Rader, Fishman & Grauer PLLC (57) ABSTRACT

A wheel traveling and operating vehicle includes a tire wheel traveling apparatus having axles in front and rear portions of a chassis frame body, an engine providing a traveling power, and a transmission. The transmission is provided with a transmission portion arranged so that an input shaft and an output shaft transverse an axis (X—X) in a vehicle longitudinal direction in parallel to each other at forward and backward positions of the axis and a bevel gear output portion outputting a tire wheel driving power to the output shaft toward a direction of the axis. The input shaft of the transmission portion is connected to the engine horizontally mounted to one side surface of right and left sides of the chassis frame body on the same axis as the engine output shaft and the bevel gear output portion is connected to front and rear tire wheel driving propeller shafts.

7 Claims, 9 Drawing Sheets

WHEEL TYPE TRAVELING AND OPERATING VEHICLE

FIELD OF THE INVENTION

The present invention relates to a wheel type traveling and operating vehicle, and particularly to a traveling and operating vehicle in which an upper revolving body having an operating machine is mounted, and a wheel type lower traveling body is provided.

BACKGROUND OF THE INVENTION

Conventionally, as a wheel type operating vehicle in which an engine is placed in a lower traveling body, there have been structured disclosed in Japanese Unexamined Patent Publication Nos. 6-211061 and 8-118966.

Figure 6:
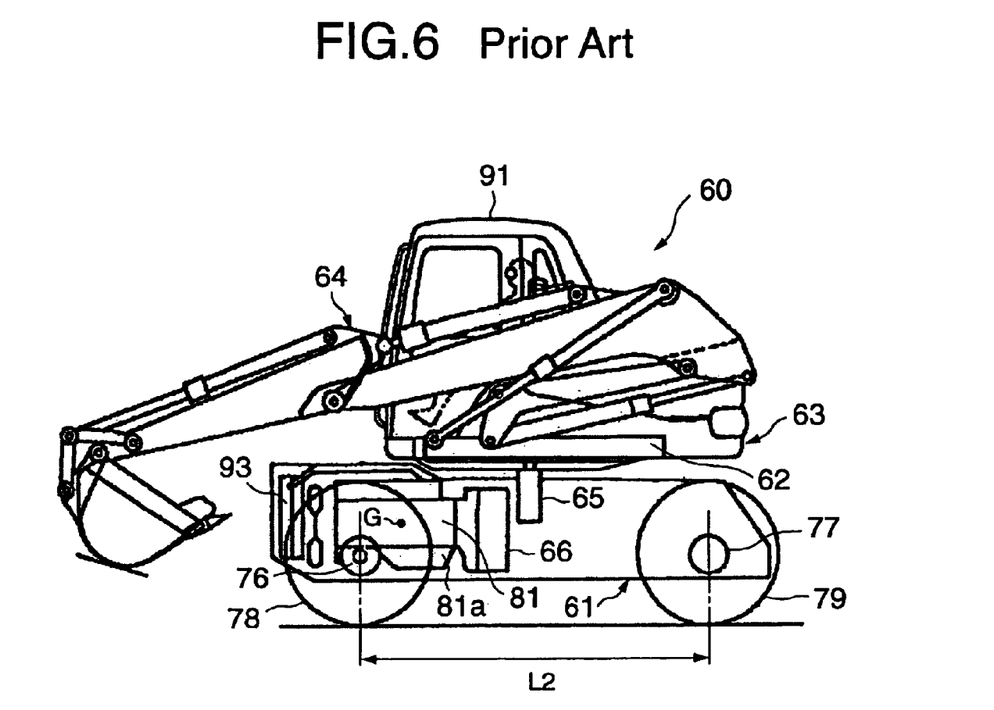
FIG. 6 is a side elevational view of a wheel type traveling and operating vehicle in accordance with a first prior art.

At first, a description will be given of a first prior art disclosed in Japanese Unexamined Patent Publication No. 6-211061 with reference to FIGS. 6 and 7. FIG. 6 is a side elevational view of an operating vehicle described in the publication, and FIG. 7 is a plan view of a lower traveling body thereof.

Figure 7:
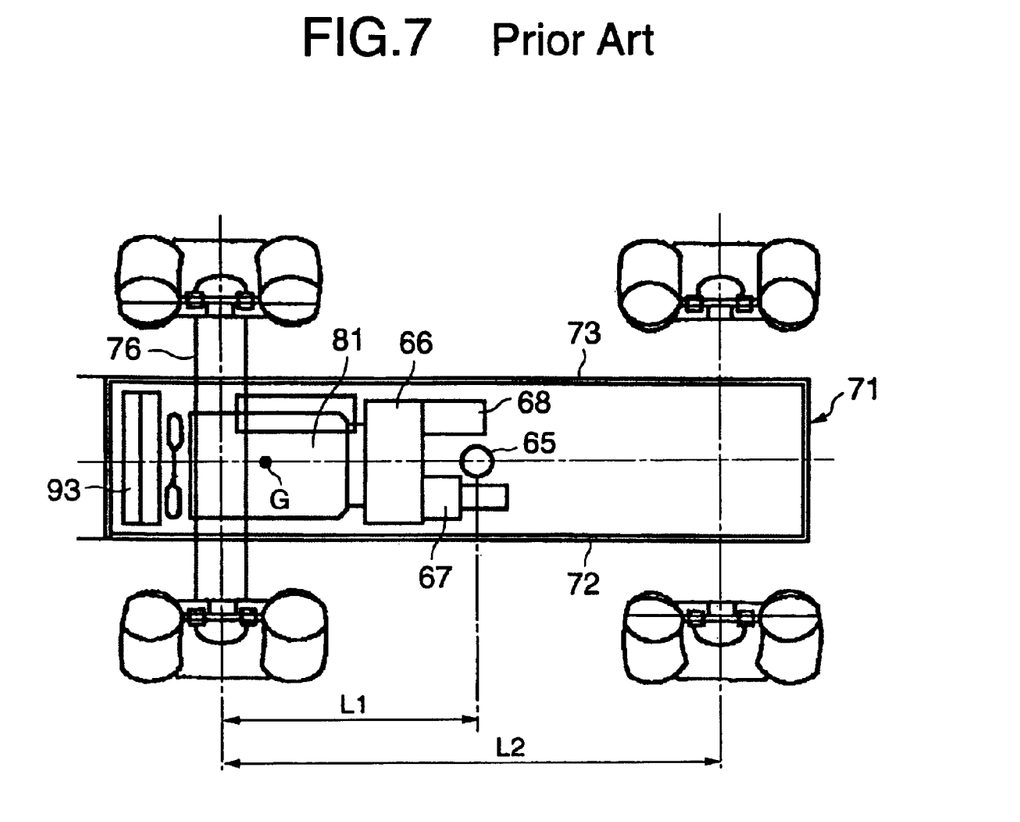
FIG. 7 is a plan view of a lower traveling body of the wheel type operating vehicle in accordance with the first prior art.

In FIGS. 6 and 7, a wheel type traveling and operating vehicle 60 is structured such that an upper revolving body 63 is rotatably mounted on an upper surface of a lower traveling body 61 via a revolving circle 62, and an operating machine 64 and an operator cabin 91 are arranged in an upper portion of the upper revolving body 63. Further, a swivel joint 65 for introducing an oil pressure from the lower traveling body 61 to the upper revolving body 63 is arranged in a center portion of revolution of the revolving circle 62. A chassis frame body 71 is arranged substantially in a center of a width of vehicle body of the lower traveling body 61 in a longitudinal direction, and a front side lower portion and a rear side lower portion of the chassis frame body 71 are respectively supported by a front axle 76 in which front wheels 78 and 78 are mounted to both end portions, and a rear axle 77 in which rear wheels 79 and 79 are mounted to both end portions.

An engine 81 is positioned in an inner side of left and right frames 72 and 73 of the chassis frame body 71 so as to be close to a center of the vehicle, as shown in FIG. 7, and is arranged so that a shallow portion of an oil pan 81a in the engine 81 astride extends over the front axle 76 as shown in FIG. 6, a driving unit 66 is connected to a rear end portion of the engine 81, and a hydraulic pump 67 and a hydraulic motor 68 are mounted to a rear end surface of the driving unit 66. Further, a radiator 93 is arranged in a forward portion of the engine 81.

Figure 8:
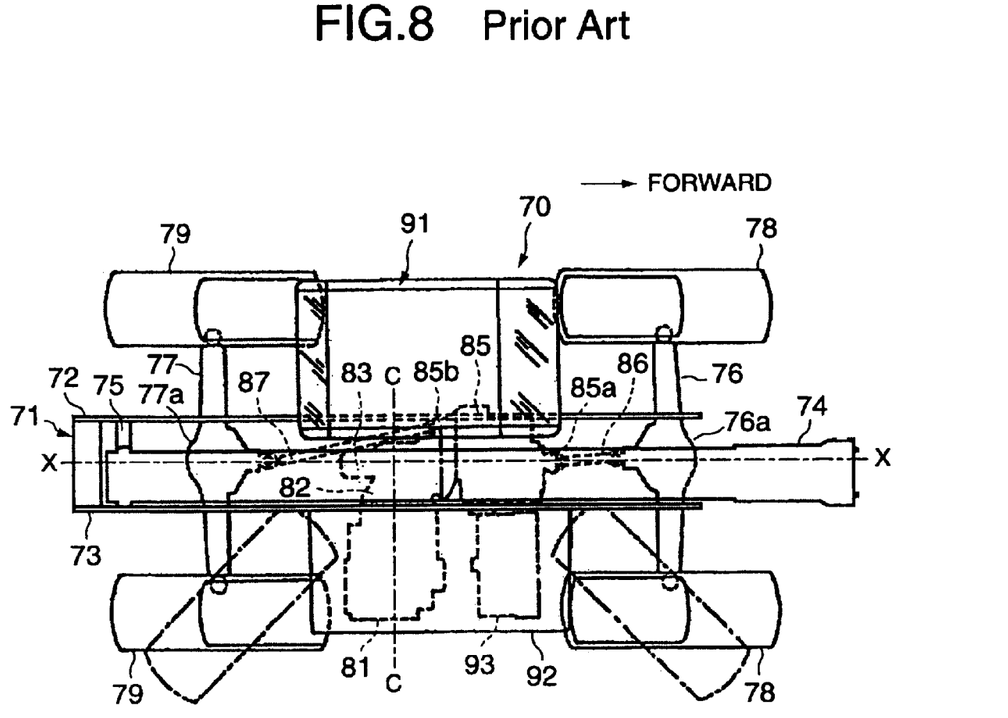
FIG. 8 is a plan view of a wheel type traveling and operating vehicle in accordance with a second prior art.
Figure 9:
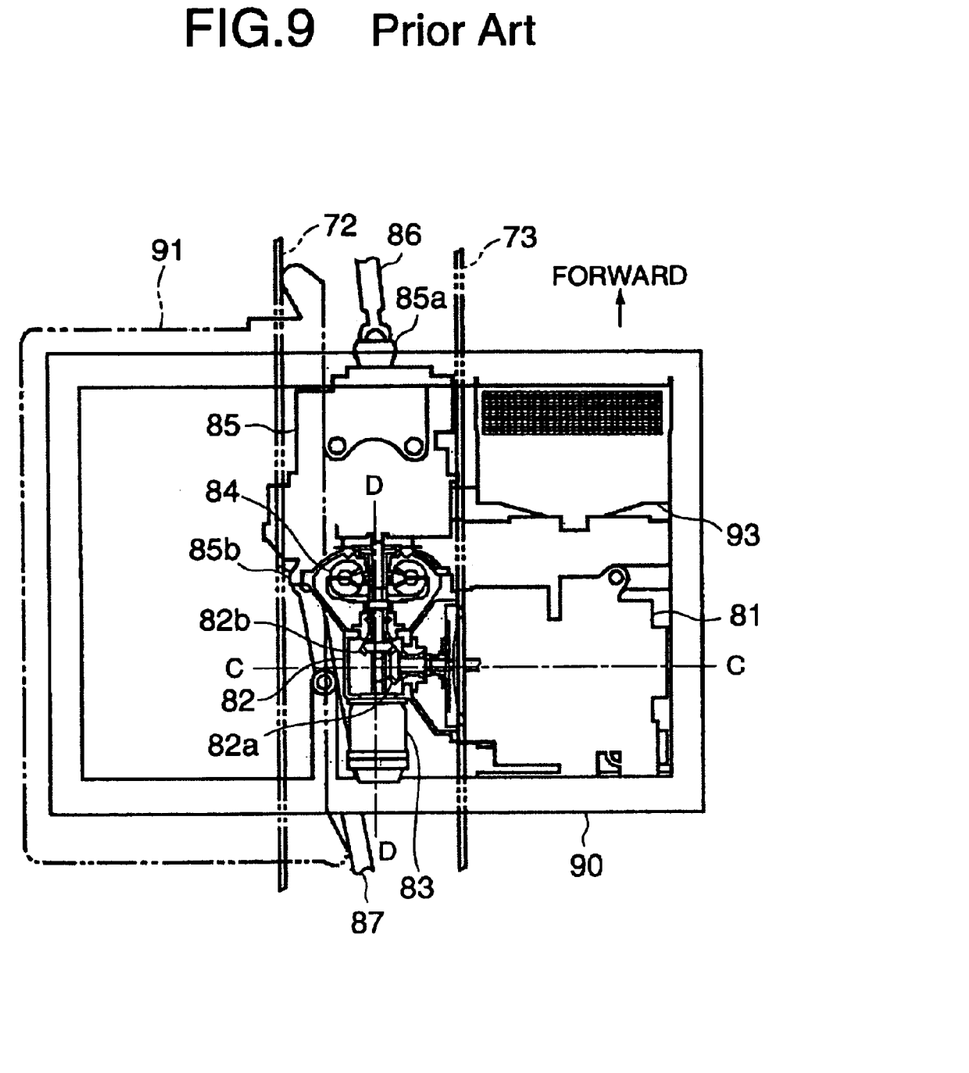
FIG. 9 is an enlarged view of a main portion of the wheel type operating vehicle in accordance with the second prior art.

Next, a description will be given of a second prior art disclosed in Japanese Unexamined Patent Publication No. 8-118966 with reference to FIGS. 8 and 9. FIG. 8 is a plan view of an operating vehicle described in the publication, and FIG. 9 is a partly enlarged view of a main portion in FIG. 8. In FIGS. 8 and 9, the same reference numerals are attached to the same constituting elements as those in FIGS. 6 and 7, and a description thereof will be omitted below.

In FIGS. 8 and 9, an operating machine 74 is arranged between left and right frames 72 and 73 of a chassis frame body 71 in a wheel type traveling and operating vehicle 70 along a longitudinal axis X—X of the vehicle, and the operating machine 74 is connected to the left and right frames 72 and 73 by a pin 75 disposed in a rear portion of the vehicle so as to freely swing in a vertical direction. A stand 90 is mounted between a front wheel 78 and a rear wheel 79 and in a lower portion of the chassis frame body 71 so as to protrude left outward and right outward of the chassis frame body 71, an operator cabin 91 is mounted on an upper surface of the stand 90 in an outer portion of the left frame 72, and an engine 81 and a radiator 93 which are covered by a housing 92 are mounted in an outer portion of the right frame 73.

The engine 81 is mounted in such a manner as to make an axis of rotation C—C of a crank shaft substantially orthogonal to an axis X—X in a longitudinal direction of the vehicle and direct an output shaft side of the engine 81 toward an inner side of the vehicle, and a transfer gear box (a bevel gear output portion) 82 is connected to an end portion in a side of the output shaft of the engine 81, and further the axis of rotation is converted into an axis D—D parallel to the longitudinal axis X—X of the vehicle by bevel gears 82a and 82b within the transfer gear box 02. On the axis D—D, a hydraulic pump 83 for driving the operating machine is mounted to a rear end portion of the transfer gear box 82, a torque converter 84 and a transmission 65 are mounted in a front end portion thereof, respectively so as to be in series in the longitudinal direction. Further, a front output shaft 85a and a rear output shaft 85b of the transmission 85 are respectively connected to respective differential gear box 76a and 77a of a front axle 76 and a rear axle 77 by propeller shafts 86 and 87.

However, in the first prior art, the following problems are generated.

(1) Since the engine 81 is arranged close to the center of the vehicle rather than the front axle 76 so as to extend astride over the front axle 76 and a protruding amount of the front end portion (the radiator 93 or the like) of the vehicle extends slightly from the front end of the front wheel 78, forward operability is improved. However, there is a possibility that the operating machine 64 interferes with the radiator 93 in the front end portion of the vehicle at a time of deep excavating at the forward portion.

(3) Since the engine 81 and the driving unit 66 are connected in series in the direction of the rotational axis and are mounted within the chassis frame body 71 in the longitudinal direction, a required space from the front axle 76 to the driving unit 66 becomes long, and accordingly, in the case that a distance L2 between the axles is not large, it is impossible to arrange the position of the center of revolution (that is, the swivel joint 65) substantially in the center of the distance L2 between the axles. Accordingly, in a compact vehicle or the like, there is a case that the position of the center of revolution can not arranged substantially in the center of the distance L2 between the axles, and a difference of relative merits is generated in an operability at the front end portion of the vehicle and the rear end portion, thereby reducing the operability.

Further, in the second prior art, since the engine 81 is placed at a position in a horizontal direction of the chassis frame body 71, it is effective for a solving means against the problems in the first prior art, however, the following problems exist.

The power transmission equipment (the transfer gear box 82, the torque converter 84, the transmission 85 and the like), and the hydraulic pump 83 are arranged in the center portion in the longitudinal direction in the inner side of the chassis frame body 71 so as to be in series in the longitudinal direction of the vehicle. Accordingly, when it is intended to apply the structure mentioned above to the wheel vehicle in which the upper revolving body is mounted, the swivel joint can be arranged only close to any one of the front and axles 76 and 77, so that it is hard to arrange the position of the center of revolution in the center between the front and rear axles 76 and 77. Further, since it is necessary to increase the longitudinal length of the chassis frame body 71, an entire length of the vehicle is increased, and a traveling property is reduced.

DISCLOSURE OF THE INVENTION

The present invention is made by taking the conventional problems mentioned above, and an object of the present invention is to provide a wheel type traveling and operating vehicle which mounts an upper revolving body having an operating machine thereon and is provided with a wheel type lower traveling body, wherein an improved operability in front and rear portions of a vehicle and a traveling property can be secured by reducing an upper surface height and a longitudinal length of the lower traveling body having an engine mounted thereon.

In order to achieve the object mentioned above, in accordance with a first aspect of the present invention, there is provided a wheel type traveling and operating vehicle comprising a chassis frame body, a tire wheel traveling apparatus including front and rear axles provided in front and rear portions of a lower portion in the chassis frame body, an engine mounted to the chassis frame body and providing a power for traveling the vehicle, and a transmission, wherein the transmission is constituted by a transmission provided with a transmission portion arranged so that an input shaft and an output shaft transverse an axis in a vehicle longitudinal direction in parallel to each other at a position in a forward and backward direction of the axis, and a bevel gear output portion outputting a front and rear tire wheel driving power to the output shaft toward a direction along the axis in the vehicle longitudinal direction, the transmission is integrally mounted to the engine by connecting the input shaft of the transmission portion to the engine in which the engine output shaft is mounted to a position in one side surface of right and left sides of the chassis frame body toward a direction transverse to the axis in the vehicle longitudinal direction in a horizontal state, so as to be on the same axis as the engine output shaft, and the bevel gear output portion of the transmission is connected to front and rear tire wheel driving propeller shafts.

In accordance with the first aspect, the following operations and effects can be obtained (1) Since the engine is arranged in a side portion of one side of the right and left sides of the chassis frame body, it is possible to make a position of a center of gravity of the vehicle low, and it is possible to improve a traveling stability.

(2) Since the engine is arranged in a side portion of one side of the right and left sides of the chassis frame body, it is possible to make a length in the longitudinal direction of the chassis frame body short, and since it is possible to make upper surfaces of the end portions in the chassis frame body flat, it is possible to improve a visibility of in the vehicle forward and backward direction. Further, since the engine is not arranged a position in a vehicle body front end side, it is possible to move the operating machine close to the axle in the forward side, and it is possible to improve an operability in the forward portion of the vehicle.

(3) Since the engine is mounted to the outer portion of one side of the right and left sides of the chassis frame body so as to be directed transversely in the direction in which the engine output shaft crosses with respect to the axis in the forward direction of the vehicle, and the input shaft of the transmission is connected on the same axis of the engine output shaft, a placing space in the lower side of the chassis frame body can be made small, it is possible to prevent the entire length in the longitudinal direction of the chassis frame body from being increased, and it is possible to obtain a compact wheel type traveling and operating vehicle.

(4) Since the transmission is structured such that the bevel gear output portion extending along the longitudinal axis of the vehicle is provided in the output shaft of the transmission, it is possible to restrict a number of rotation of the bevel gear to a low level in comparison with the structure in which the bevel gear output portion extending along the longitudinal axis of the vehicle is provided so as to be perpendicular to the engine output shaft, thereby making it possible to reduce a noise.

(5) Since the structure is made such that the engine and the transmission are not placed in the inner portion of the chassis frame body, it is possible to reduce an entire length of the chassis frame body. Further, it is possible to form the frame structure in a transversely long chassis frame body having a simple box-shaped cross section, and the structure can be formed in a chassis frame having a light weight and a high rigidity.

(6) Since the engine is arranged in the side portion of the chassis frame body, it is possible to improve a maintenance performance.

As a result of the matters mentioned above, it is possible to achieve an improved operation stability and traveling stability.

In accordance with a second aspect, the structure is made such that in the first aspect, the chassis frame body is constituted by a transversely long chassis frame body having a box-shaped cross section and having a revolving circle mounting an upper revolving body in an upper surface side so as to freely revolve, the engine is horizontally mounted to a frame body side position between a swivel joint positioned at a center of the revolving circle of the transversely long chassis frame body and a front axle or a rear axle, and the transmission integrally formed with the engine is inserted and arranged in a space in a lower side of the frame body.

In accordance with the second aspect, in addition to the operations and the effects of the first aspect, the following operations and effects can be obtained.

Since the transmission is integrally connected to the engine mounted to the chassis frame body, the transmission and the engine can be treated as an integral structure, so that it is possible to easily mount the transmission integrally formed in the transversely long chassis frame body having the box-shaped cross section and having a simple frame structure to the engine. Further, since the structure is made such that the engine is horizontally mounted to the outer portion of one side of the right and left sides in the transversely long chassis frame body in the direction in which the engine output shaft transverses with respect to the axis in the vehicle longitudinal direction, and the input shaft of the transmission is connected to the lower side of the transversely long chassis frame body on the same axis of the engine output shaft, a transmission placing space in the lower side of the transversely long chassis frame body can be made small, it is possible to insert and place the transmission in the narrow space between the swivel joint positioned at the center of the revolving circle and the front axle or the rear axle, it is possible to prevent the entire length in the longitudinal direction of the transversely long chassis frame body from being long, and it is possible to obtain a compact wheel type traveling and operating vehicle.

In accordance with a third aspect, the structure is made such that in the second aspect, the engine mounted to the side portion of one side of the right and left sides of the transversely long chassis frame body having the box-shaped cross section is inserted and mounted an engine flywheel to an inner side of a bottom surface of the transversely long chassis frame body.

In accordance with the third aspect, in addition to the operations and the effects of the second aspect, since it is possible to restrict a protruding amount of the engine to the side portion of the transversely long chassis frame body, it is possible to restrict an increase of an entire width in a lateral direction of the lower traveling body. Further, it is possible to restrict a height of the upper surface of the chassis frame body while securing a road clearance so as to reduce an entire height.

In accordance with a fourth aspect, the structure is made such that in the second aspect, the transversely long chassis frame body having the box-shaped cross section has cantilever stands suspended downward respectively in right and left side portions of the frame body between the front wheel and the rear wheel, the integrally formed engine and transmission and a radiator are mounted on one stand, and a working fluid tank and a fuel tank are mounted on another stand, respectively.

In accordance with the fourth aspect, in addition to the operations and the effects of the or second aspect, since it is possible to make a load distribution applied to the right and left tire wheels of the lower traveling body proper, it is possible to secure a traveling stability and an operation stability. Further, it is possible to stably support the engine, the working fluid tank and the fuel tank which are arranged in the right and left side portions of the transversely long-chassis frame body, by the cantilever stands.

In accordance with a fifth aspect, the structure is made such that in the first, second or third aspect, the transmission portion of the transmission is a vertically flat-type multi-shaft transmission portion in which the input shaft and an intermediate shaft provided with rotary clutches, and the output shaft are arranged in parallel so as to transverse the axis at a position in a forward and backward direction of the axis in the vehicle longitudinal direction in parallel to each other, the bevel gear output portion of the transmission is provided in a side surface of one side of right and left sides in a housing external portion of the vertically flat-type multi-shaft transmission portion, and is connected to the output shaft so as to output of the front and rear tire wheel driving power in a perpendicular direction of the input shaft.

In accordance with the fifth aspect, in addition to the operations and the effects of the first, second or third aspect, the following operations and effects can be obtained.

(1) Since the structure is made by the multi-shaft type transmission, it is possible to make an outer diameter of the gear and the clutch in each of the shafts small, a size of the transmission case in the longitudinal direction of the vehicle becomes compact, and the transversely long chassis frame body having the box-shaped cross section can be easily mounted to the lower side by inserting it to a narrow space between the swivel joint and the front axle or the rear axle.

(2) Further, the gear in each of speed change gears is dispersed into each of the shafts, and it is possible to make a thickness of the transmission in an axial direction small. As a result, a power train can be easily arranged so as to be directed transversely with respect to an axis in the longitudinal direction of the vehicle.

(3) Since the input shaft, the intermediate shaft and the output shaft of the multi-shaft type transmission are arranged in parallel substantially in the longitudinal direction, it is possible to form the transmission in a flat shape also in the vertical direction. Accordingly, since it is easy to secure the road clearance below the transmission, it is possible to make the entire height of the lower traveling body low. This can bring out a great effect together with the item (1) of the effects in the first aspect.

In accordance with a sixth aspect, the structure is made such that in the fourth aspect, the transmission is a transmission which has a hydraulic pump connected to the input shaft, a hydraulic motor connected to the hydraulic pump by a hydraulic circuit, a second input shaft inputting a rotation of the hydraulic motor, and a rotary clutch selectively connecting the second input shaft and the output shaft, and includes a hydraulic power transmitting transmission portion selectively outputting a hydraulic rotary power to the output shaft.

In accordance with the sixth aspect, in addition to the operations and the effects of the fourth aspect, the following operations and effects can be obtained.

It is possible to easily execute a low speed traveling, for example, a position adjustment of the vehicle during the operation and/or a creeping speed traveling while operating, by driving the output shaft via the second input shaft by the hydraulic motor, and it is possible to mechanically efficiently travel by driving via the first input shaft at a time of traveling at a high speed. Further, in the traveling by the hydraulic motor, since the intermediate shaft, the gear and the clutch for backward traveling are not required, it is possible to make the structure of the transmission compact.

In accordance with a seventh aspect, the structure is made such that in the fifth aspect, the transmission including the hydraulic power transmitting transmission portion is a transmission in which the bevel gear output portion connected to the output shaft is arranged with a step in a lower side from the hydraulic pump and the hydraulic motor which are respectively connected to the input shaft and the second input shaft.

In accordance with the seventh aspect, in addition to the operations and the effects of the fifth aspect, since the output shaft and the bevel gear output portion connected to the output shaft are provided at a position with the step in the lower side of the hydraulic pump and the hydraulic motor connected to the transmission input shaft, no interference is generated even when inserting the driving propeller shafts of the front and rear axles from the bevel gear output portion in the perpendicular direction of the transmission input shaft.

In accordance with an eighth aspect, the structure is made such that in the fourth or sixth aspect, the bevel gear output portion is a bevel gear output portion which is provided with a clutch mechanism which always transmits a rotation power to the rear output shaft in a rear side of the vehicle, and selectively transmits the rotation power to the front output shaft in a front side of the vehicle.

In accordance with the eighth aspect, in addition to the operations and the effects in the fourth or sixth aspect, since it is possible to travel in a state of selectively switching a four-wheel drive and a two-wheel drive, it is possible to achieve a traveling stability at a low speed in the four-wheel drive, and it is possible to travel at a high speed in the two-wheel drive.

DETAILED DESCRIPTION OF PREFERRED EMBODIMENT

A description will be in detail given below of an embodiment of a wheel type traveling and operating vehicle in accordance with the present invention with reference to FIGS. 1 to 3.

Figure 1:
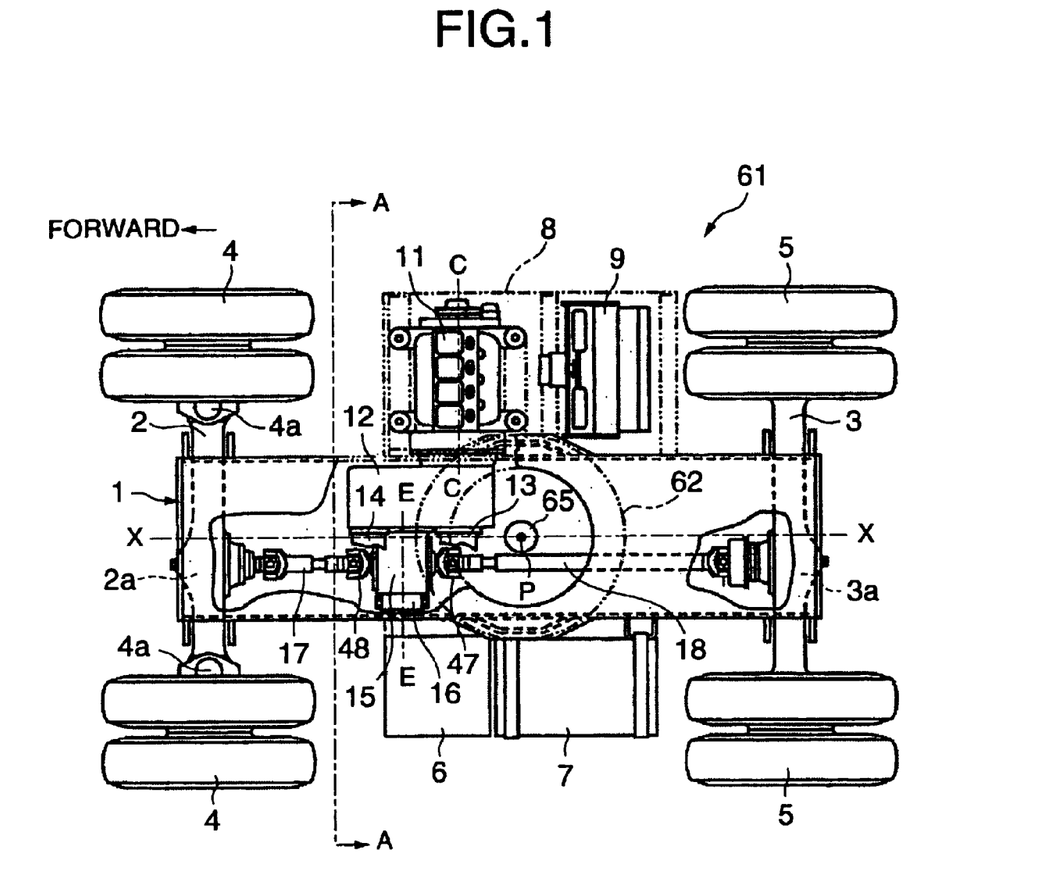
FIG. 1 is a partly cross sectional plan view of a lower traveling body of a wheel type traveling and operating vehicle in accordance with an embodiment of the present invention.
Figure 2:
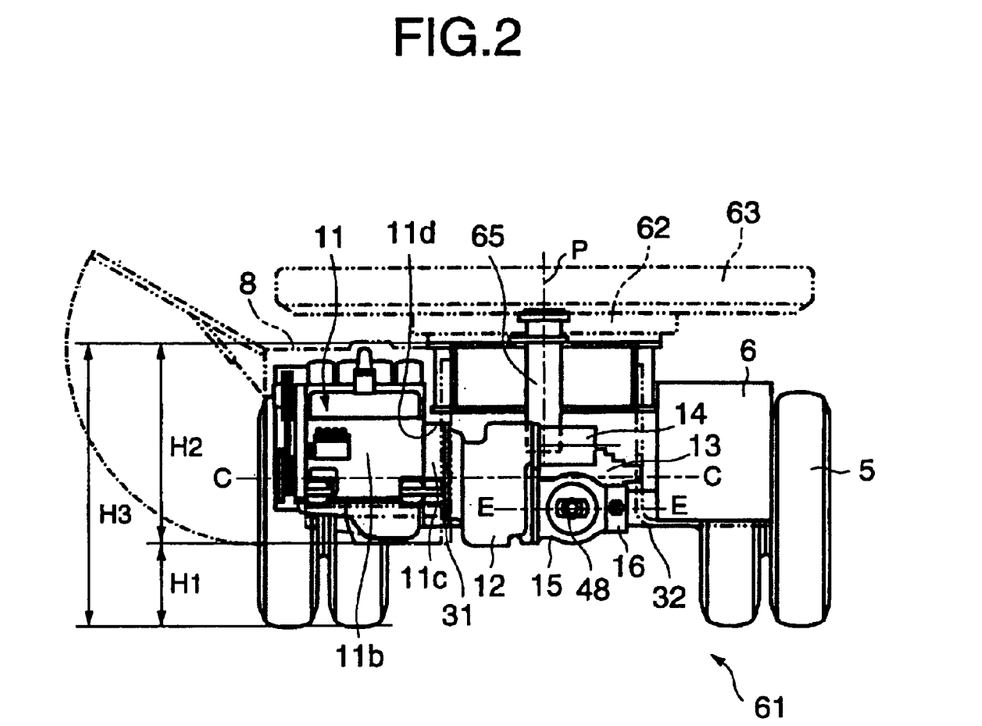
FIG. 2 is a cross sectional view along a line A—A in FIG. 1.

FIG. 1 is a partly cross sectional plan view of a lower traveling body of a wheel type traveling and operating vehicle, and FIG. 2 is a cross sectional view along a line A—A in FIG. 1. In this case, the same reference numerals are attached to the same constituting elements as those in FIGS. 6 and 7, and a description will be omitted below.

In FIGS. 1 and 2, a lower traveling body 61 is provided with a transversely long chassis frame body 1 having a box-shaped cross section in a direction of a vehicle body width along an axis X—X in a vehicle longitudinal direction, and front and rear end portions of the chassis frame body 1 are respectively supported by a front axle 2 and a rear axle 3. Front wheels 4 and 4 and rear wheels 5 and 5 are respectively mounted to respective right and left end portions of the front axle 2 and the rear axle 3 in such a manner as to protrude from the vehicle body width of the chassis frame body 1, and the front wheels 4 and 4 are freely steered around pins 4a and 4a. A tire wheel traveling apparatus includes the front and rear axles 2 and 3, the front and rear wheels 4 and 5, and the pins 4a and 4a. Further, a revolving circle 62 having a revolving bearing (not shown) is arranged in a substantially center portion in a longitudinal direction of an upper surface of the chassis frame body 1, and an upper revolving body 63 is mounted on an upper surface of the revolving circle 62. Further, a swivel joint 65 is arranged in a center, that is, a center P of revolution of the revolving circle 62 from a lower surface of the upper revolving body 63 toward a lower portion.

Next, cantilever stands 32 and 31 respectively suspending downward are provided between the front wheel 4 and the rear wheel 5 and on left and right side surfaces of the chassis frame body 1 with respect to a forward portion of the vehicle, and a working fluid tank 6 and a fuel tank 7 are mounted on the stand 32, and a radiator 9 and an engine 11 which are covered by housing 8 are mounted on the stand 31. The engine 11 is arranged so as to direct a rotary axis C—C of a crank shaft thereof transverse with respect to an axis X—X in the vehicle longitudinal direction and direct a side of an output shaft to a side of the chassis frame body 1, and further a position of the rotary axis C—C in the vehicle longitudinal direction is arranged at a position avoiding the swivel joint 65 and at which the engine 11 is not in contact with the front wheel 4, and a position in a height direction is arranged so as to be positioned below a lower surface of the chassis frame body 1.

Further, a transmission 12 integrally connected to an end portion of an output shaft (a center side of the vehicle) of the engine 11 is arranged in a lower portion of the chassis frame body 1, and the engine 11 and the transmission which are integrally formed are mounted to the chassis frame body 1 by a vibration proof rubber (not shown). In this case, as shown in FIG. 2, the engine 11 is arranged so as to insert and position a portion having a reduced height and existing in a side of the output shaft (close to a center of the vehicle) rather than the cylinder block 11b of the engine 11, that is, an upper surface 11d of a flywheel housing 11c to a lower space of the chassis frame body 1, thereby restricting a protruding amount of an end portion in an opposite side to the output shaft of the engine 11 to an external portion of the vehicle.

The transmission 12 is provided with a transmission portion arranged so that an input shaft is concentric with the engine rotary axis C—C and an output shaft is in parallel to the rotary axis C—C and on an axis E—E apart therefrom in the vehicle longitudinal direction, respectively, and with a bevel gear output portion 15 mounted and attached to an output side end surface (a left surface of the vehicle) of the transmission 12 on the axis E—E. A front output shaft 48 and a rear output shaft 47 extending along the axis X—X in the vehicle longitudinal direction are provided in a vehicle forward side end portion and a vehicle rear side end portion of the bevel gear output portion 15, respectively. The front and rear output shafts 48 and 47 are respectively connected to a differential gear box 2a of the front axle 2 and a differential gear box 3a in the rear axle 3 via the propeller shafts 17 and 18.

Figure 3:
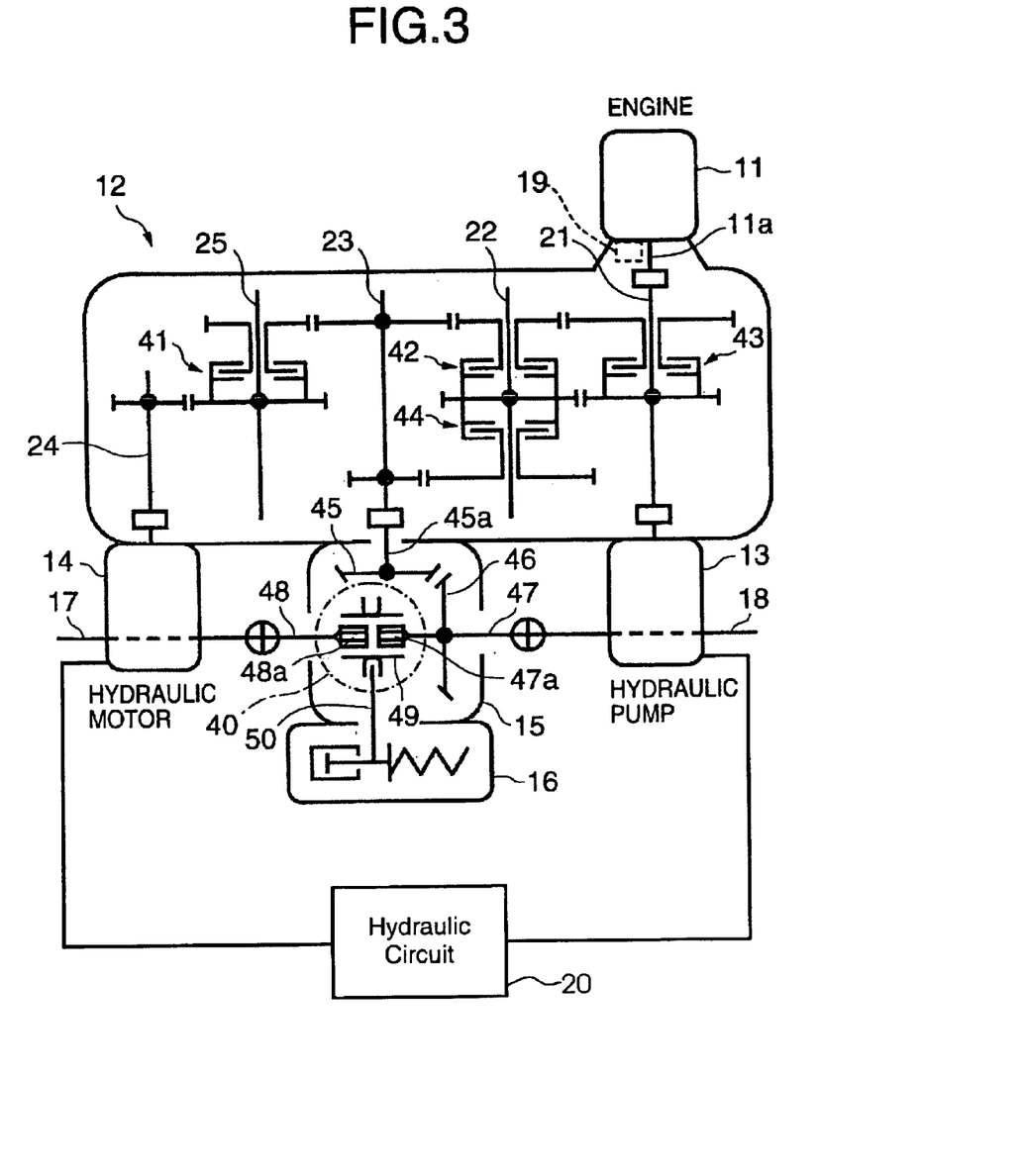
FIG. 3 is a schematic view of a power train of the wheel type traveling and operating vehicle in accordance with the embodiment of the present invention.
Figure 4:
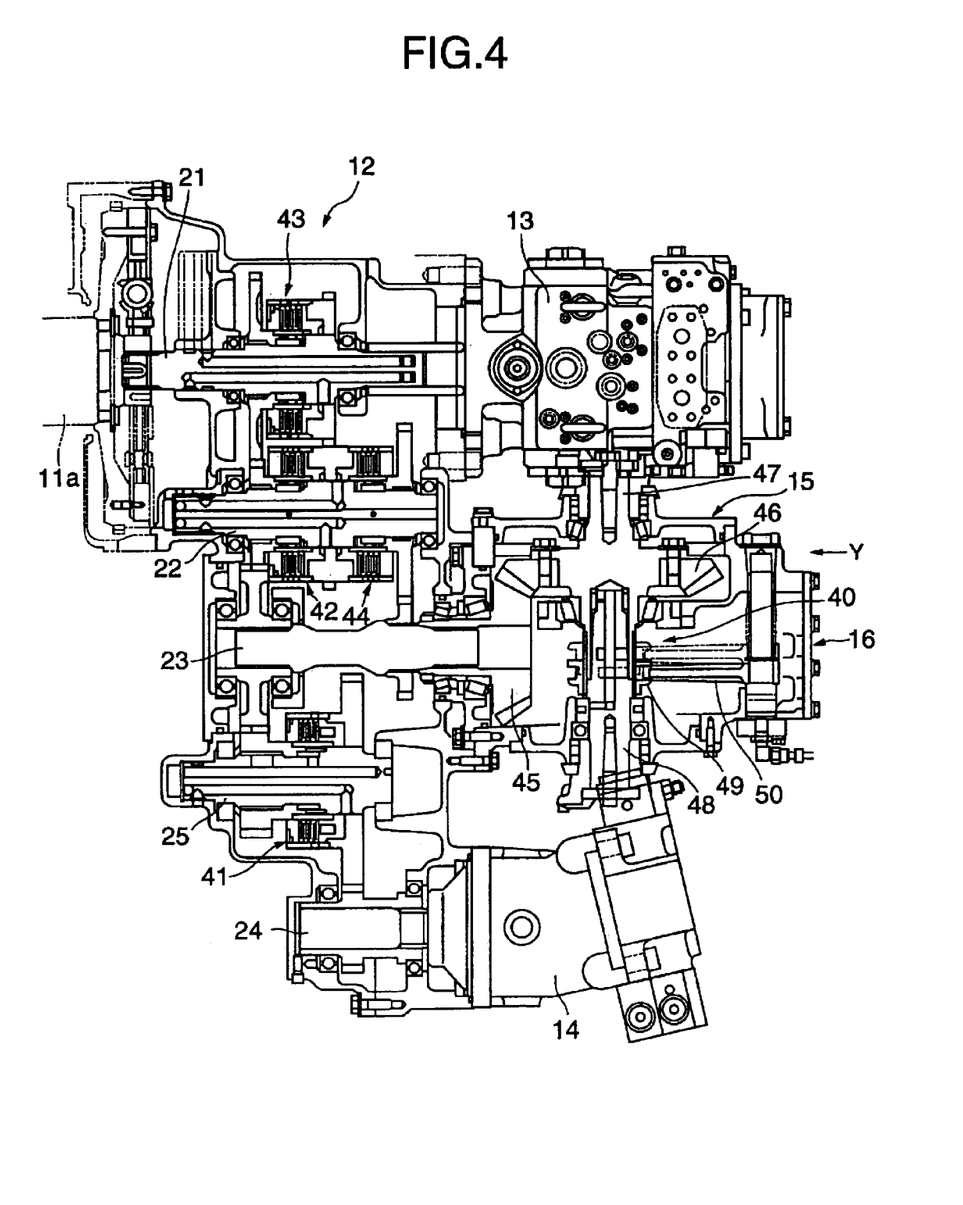
FIG. 4 is a view of details in FIG. 3.
Figure 5:
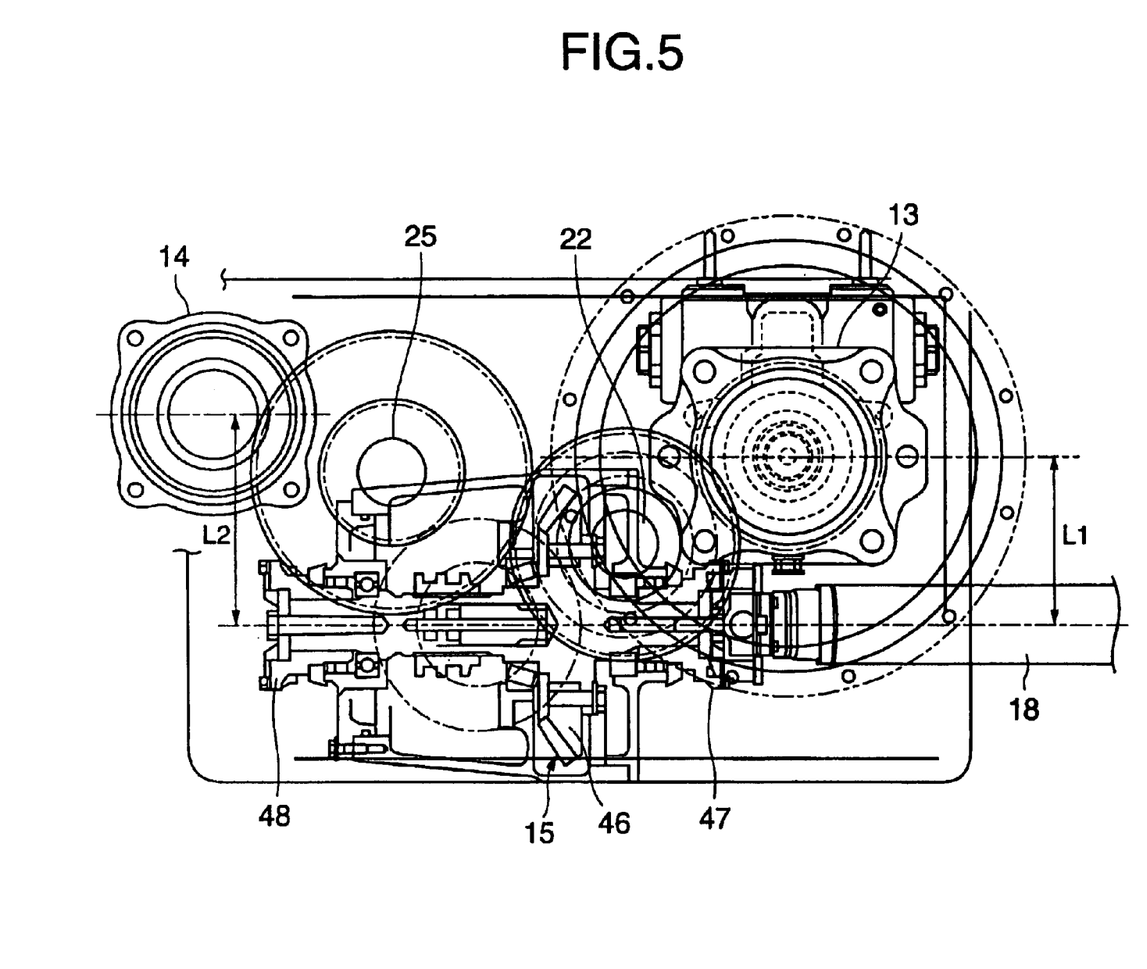
FIG. 5 is a view as seen from an arrow Y in FIG. 4.

Next, a description will be given in detail of a power train with reference to FIGS. 3 to 5 FIG. 3 is a schematic view of the power train, FIG. 4 is a view of details in FIG. 3, and FIG. 5 is a view as seen from an arrow Y in FIG. 4. The transmission 12 is constructed as a multi-shaft type transmission for the purpose of being received in the lower space of the chassis frame body 1, and is provided a first input shaft 21 connected to the output shaft 11a of the engine 11, an intermediate shaft 22 and an output shaft 23 in a horizontal direction so as to be arranged substantially longitudinally and in parallel, in the multi-shaft type transmission. Further, the second input shaft 24 and the intermediate shaft 25 are arranged substantially longitudinally and in parallel so as to be provided in the horizontal direction and a clutch 41 is provided between the second input shaft 24 and the intermediate shaft 25 for selectively engaging therebetween the hydraulic motor 14 is connected to the second input shaft 24, and the hydraulic pump 13 driving the hydraulic motor 14, through a hydraulic circuit 20, is connected to the first input shaft 21. A hydraulic power transmitting portion includes the hydraulic pump 13, the hydraulic circuit 20, the hydraulic motor 14, the second input shaft 24, the clutch 41, and the intermediate shaft 25. In this case, the hydraulic pump 13 may commonly serve as a hydraulic pump for driving an operating machine, or maybe mounted and attached to a PTO gear box 19 of the engine 11.

Further, the bevel gear output portion 15 is connected to the output shaft 23, and the bevel gear output portion 15 is arranged with steps of predetermined distances L1 and L2 in a lower side from the hydraulic pump 13 and the hydraulic motor 14 respectively connected to the first input shaft 21 and the second input shaft 24.

In this case, first, second, third and fourth speed stages can be respectively obtained by independently engaging respective clutched 41, 42, 43 and 44 in an inner portion of the transmission 12, and in the first speed stage, the structure is made such that a backward moving speed can be obtained by switching an operation valve (not shown) or reversing a direction of rotation of the hydraulic motor 14.

Further, a bevel gear output portion 15 is mounted and attached to the output portion of the transmission 12, and a rotation of the transmission output shaft 23 is transmitted to the rear output shaft 47 via an input shaft 45a and bevel gears 45 and 46 within the bevel gear output portion 15, whereby the axis of rotation is converted into the vehicle longitudinal direction.

Further, the front output shaft 48 having a concentric axis is provided in a forward direction of the rear output shaft 47, and the rear output shaft 47 and the front output shaft 48 are provided with splines 47a and 48a formed on an outer peripheral surface of shaft end portions opposing to each other, and can be freely connected to each other by a sleeve 49, which is formed with a spline hole on its inner peripheral surface and inserted to the splines 47a and 48a so as to freely shift in a direction of, a spline groove. The sleeve 49 is shifted in the vehicle longitudinal direction, that is, the spline groove direction by a shift apparatus 16 provided with a fork 50, so as to selectively connect the rear output shaft 47 and the front output shaft 48, whereby the clutch mechanism 40 is constructed.

In accordance with the structure mentioned above in FIGS. 1 to 3, the following operations and effects can be obtained.

(1) Since the engine 11 is arranged in one side portion of the right and left sides with respect to the axis in the longitudinal direction of the transversely long chassis frame body 1 so as to restrict a place of the engine to be low, not only is it possible to make a position of the center of gravity of the vehicle low, but also as shown in FIG. 2, an upper surface height H3 of the lower traveling body 61 is determined by a sum of an engine height H2 and a predetermined road clearance H1 below the engine, so that it is possible to make the height H3 of the lower traveling body as low as possible to a limit. Accordingly, it is possible to make the position of the center of gravity of the vehicle further low and it is possible to improve a traveling stability.

In accordance with the present embodiment, a tire diameter of the front and rear wheels 4 and 5 is reduced for the purpose of achieving this, and a double-tire is employed for the purpose of compensating a load capacity property.

(2) Since the engine 11 is arranged in one side portion of the right and left sides of the transversely long chassis frame body 1, it is possible to reduce the length of the chassis frame body 1 in the longitudinal direction, and the front and rear end portions of the chassis frame body 1 can be respectively set to the lengths capable of being supported by the front axle 2 and the rear axle 3, and since any protruding structure such as the engine or the like does not exist on the upper surface of the front and rear end portions, a visibility is improved. Further, it is possible to move the operating machine 64 close to the respective axles 2 and 3 in the forward and rearward portions of the vehicle. As a result, it is possible to improve an operability in the forward portion and the rearward portion of the vehicle. Further, it is possible to reduce a distance between the front axle 2 and the rear axle 3, and it is possible to make a radius of rotation at a time of steering small. Further, since it is possible to make the upper surface of the front and rear end portions of the chassis frame body 1 flat, a sheet metal welding structure becomes simple and it is possible to reduce a cost.

(3) Since the engine 11 is mounted to any one side portion of the right and left sides of the transversely long chassis frame body 1 so as to be directed transversely with respect to the direction in which the engine output shaft 11a cross with respect to the vehicle longitudinal axis X—X, and the transmission 12 is mounted to the lower side of the transversely long chassis frame body 1 by connecting the input shaft 21 of the transmission 12 onto the same axis of the engine output shaft 11a, it is possible to make the placing space in the lower side of the chassis frame body 1 small, it is possible to prevent the entire length of the chassis frame body 1 in the longitudinal direction from being increased, and it is possible to obtain a compact wheel-type traveling and operating vehicle.

Further, since the transmission 12 sets the direction of the rotary shaft thereof to be transverse with respect to the vehicle longitudinal axis X—X, and is arranged in the lower space of the transverse long chassis frame body 1, it is possible to arrange the swivel joint 65 arranged in the center P of revolution close to the upper portion in the side portion of the transmission 12. Accordingly, it is possible to position the center P of revolution substantially at the center in the longitudinal direction of the vehicle. As a result, a difference of relative merits in view of the operability and the visibility can be lost between the forward portion and the rearward portion of the vehicle.

(4) Since the bevel gears 45 and 46 of the bevel gear output portion 15 are connected to the output shaft 23 of the transmission 12 so as to convert the output shaft 23 of the transmission 12 into the output shafts 47 and 48 of the bevel gear output portion 15 substantially in the perpendicular direction, that is, along the vehicle longitudinal axis X—X, it is possible to restrict the number of rotation of the bevel gears 45 and 46 in the bevel gear output portion 15 to be low in comparison with the structure as described in the second prior art mentioned above having the bevel output shaft directly connected to the engine output shaft and extending along the vehicle longitudinal axis X—X, so that it is possible to reduce a sound.

(5) Since it is unnecessary to place the engine and the transmission in the inner portion of the chassis frame body 1 by arranging the power train from the engine 11 to the bevel gear output portion 15 in the right and left side portions and the lower portion of the chassis frame body 1, it is possible to form the chassis frame body 1 in the transversely long (that is, having a reduced height) simple box-shaped cross sectional shape with no upper opening portion. As a result, it is possible to structure the chassis frame having a reduced weight and a high rigidity.

(6) Since the engine 11 is arranged in a side portion of one side of the right and left sides of the chassis frame body 1, the operator can move in close proximity of the engine 11 while being on the ground, so that a maintenance can be easily executed.

(7) It is possible to treat the transmission 12 and the engine 11 as an integral structure by integrally connecting the transmission 12 to the end portion in the output shaft side of the engine 11, and it is easy to mount the transmission 12 and the engine 11 corresponding to the integral structure to the transversely long chassis frame body 1 having the box-shaped cross section corresponding to the simple frame structure. Further, since the structure is made such that the engine 1 is horizontally mounted to an outer portion of one side in the right and left sides of the transversely long chassis frame body 1 in a direction in which the engine output shaft 11*a* transverses with respect to the axis X—X in the vehicle longitudinal direction, and the input shaft 21 of the transmission 12 connected to the lower side of the transversely long chassis frame body 1 on the same axis of the engine output shaft 11*a*, a transmission placing space in the lower side of the transversely long chassis frame body can be made small, it is possible to insert and place the transmission 12 in a narrow space between a swivel joint 65 positioned at a center P of a revolving circle and the front axle 2 or the rear axle 3, it is possible to prevent an entire length in the longitudinal direction of the transversely long chassis frame body 1 from being increased, and it is possible to obtain a compact wheel type traveling and operating vehicle. Further, accordingly, it is easy to position the center P of revolution substantially at the center of the vehicle in the longitudinal direction.

(8) Since the transmission 12 is integrally connected to the end portion of the output shaft side of the engine 11, whereby both of the elements can be treated as the integral structure, it is possible to select a support point from a wide range of the integral structure 11 and 12 at a time of mounting and attaching the integral structure 11 and 12 to the chassis frame body 1, and it is possible to arrange the vibration proof rubber at an optimum support point, for example, obtained by considering a position of a center of gravity of the integral structure. Accordingly, it is easier to position the center P of revolution substantially center in the longitudinal direction of the vehicle, and it is possible to improve the operation stability and the traveling stability of the vehicle.

(9) Since the engine 11 is mounted so that the flywheel housing portion (the portion having the reduced height) in the output shaft side of the engine 11 is positioned at the lower portion of the transversely long chassis frame body 1 having the box-shaped cross section, that is, the engine 11 is mounted by inserting to an inner side of a bottom surface of the transversely long chassis frame body 1, thereby restricting the protruding amount of the engine 11 toward the side portion of the chassis frame body 1, it is possible to restrict an increase of the entire width in the lateral direction of the lower traveling body. Further, it is possible to restrict the height of the upper surface in the transversely long chassis frame body 1 so as to make the entire height low while securing the road clearance.

(10) Since the engine 11 and the radiator 9 are arranged between the front wheel 4 and the rear wheel 5 and in any one side of the right and left side portions of the chassis frame body 1, and the working fluid tank 6 and the fuel tank 7 are arranged in another side respectively, it is possible to make the load distribution applied to the right and left tire wheels in the lower traveling body proper, so that it is possible to secure the traveling stability and the operation stability. Further, it is possible to stably support the engine 11 and the working fluid tank 6, and the fuel tank 7 respectively arranged in the left and right side portions of the transversely long chassis frame body 1, by the cantilever stands 31 and 32.

(11) Since the transmission 12 is constituted by the multi-shaft type transmission, it is possible to make the outer diameters of the gear and the clutch in each of the shafts, in comparison with a planetary gear type transmission. Accordingly, since the size of the transmission case in the vehicle longitudinal direction becomes compact, it is possible to insert the transmission 12 to the narrow space between the swivel joint 65 and the front axle 2 or the rear axle 3 so as to mount the transversely long chassis frame body 1 having the box-shaped cross section to the lower side. Further, since the swivel joint 65 can be arranged close to the input shaft 21 of the transmission 12, the rotary axis C—C of the engine 11 and the swivel joint 65 can be arranged at a short distance in the vehicle longitudinal direction, so that it is possible to arrange both of the elements substantially in the center in the vehicle longitudinal direction.

(12) Since the transmission 12 is constituted by the multi-shaft type transmission, the gear in each of the speed change stages is dispersed into each of the shafts, so that the gears in every speed change stages are not arranged in series in the axial direction as is different from the planetary gear type transmission, whereby it is possible to make a thickness of the transmission 12 in the axial direction small. Accordingly, since it is possible to make the length of the power train short, it is possible to arrange the power train transversely with respect to the axis X—X in the vehicle longitudinal direction.

(13) Further, since the input shafts 21 and 24, the intermediate shafts 22 and 25 and the output shaft 23 of the transmission 12 constituted by the multi-shaft type transmission are arranged in parallel substantially longitudinally so as to be provided in the horizontal direction, it is possible to form the transmission 12 in the flat shape in the vertical direction. Accordingly, even when arranging the transmission 12 in the lower portion of the chassis frame body 1, it is possible to secure the road clearance, so that it is possible to achieve the lower traveling body having the reduced height. A greater effect can be obtained by simultaneously achieving the effect in the item (1) mentioned above.

(14) Since the clutch mechanism for selectively transmitting the torque to the front output shaft 48 is provided in the inner portion of the bevel gear output portion 15, it is possible to travel while selectively switching the four-wheel drive state and the two-wheel drive. As a result, as well as achieving the low center of gravity, it is possible to achieve a traveling stability at a low speed in accordance with a four-wheel drive and it is possible to travel at a high speed.

(15) Since the clutch for selectively engaging between the second input shaft 24 driven by the hydraulic motor 14 and the output shaft is provided in the transmission 12, it is possible to easily execute the low speed traveling, for example, the position adjusting of the vehicle under operation and/or the creeping speed traveling while operating, by suitably operating the clutch, and at a time of traveling at the high speed, it is possible to mechanically effectively travel only by the first input shaft.

(16) As a result of the item (15) mentioned above, it is possible to omit the torque converter, whereby it is possible to construct the power train in a simple and compact manner.

(17) Since the second input shaft 24 driven by the hydraulic motor 14 is arranged in the transmission 12, it is possible to switch between the forward traveling and the backward traveling by the hydraulic motor or the operation valve, so that the intermediate shaft, the gear and the clutch for backward traveling are not required. Accordingly, it is possible to construct the transmission 12 in a simple and compact manner.

(18) Since the output shaft 23 and the bevel gear output portion 15 connected to the output shaft 23 are provided at the position with the step of the predetermined distances L1 and L2 in the lower side of the hydraulic pump 13 and the hydraulic motor 14 respectively connected to the input shafts 21 and 24 of the transmission 12, no interference is generated even when inserting the driving propeller shafts 17 and 18 of the front and rear axles from the bevel gear output portion 15 in the perpendicular direction of the transmission input shafts 21 and 24.

(19) The hydraulic pump 13 for driving the hydraulic motor 14 in the items (14) to (16) mentioned above can be mounted and attached to the PTO gear box 19 of the engine in addition that it is mounted and attached to the input shaft of the transmission 12, and in this case, it is possible to make the transmission more compact.

As a result mentioned above, it is possible to construct the wheel-type traveling and operating vehicle which can achieve an improved operability in the forward and backward portions of the vehicle, as well as the engine is mounted to the lower traveling body so as to achieve an improved traveling stability and operation stability.

In this case, as shown in FIGS. 1 and 2, the present invention can be widely applied to the wheel-type traveling and operating vehicle provided with the revolving circle, and in this case, the same operations and effects can be obtained.

What is claimed is:

1. A wheel traveling and operating vehicle comprising:
a chassis frame body
including front and rear axles provided in front and rear portions of a lower portion in said chassis frame body;
an engine exteriorly mounted to said chassis frame body and providing power for the traveling vehicle;
a working fluid tank and a fuel tank exteriorly mounted to said chassis frame body on an opposite side of the engine and between the front and rear axles; and
a transmission disposed interiorly of said chassis frame body,
wherein said transmission includes a transmission portion arranged so that a transmission input shaft and a transmission output shaft are in a transverse direction of an axis (X—X) in a vehicle longitudinal direction in parallel to each other at a position in a forward and backward direction of said axis (X—X), and a bevel gear output portion outputting front and rear tire wheel driving power to said transmission output shaft toward a direction along the axis (X—X) in the vehicle longitudinal direction,
said transmission being integrally mounted to said engine by connecting said transmission input shaft of said transmission portion to an engine output shaft of the engine so as to be on the same axis in a direction transverse to the axis (X—X) in a horizontal state,
the bevel gear output portion of said transmission is connected to front and rear tire wheel driving propeller shafts, and
a swivel joint pf an upper revolving body is positioned at a center P between said front axle and said rear axle,
wherein said chassis frame body is configured as a transversely long chassis frame having a box-shaped cross section and having a revolving circle mounting the upper revolving body in an upper surface side so as to freely revolve, said engine is horizontally mounted to a frame body side position between the swivel joint positioned at the center (P) of the revolving circle of said transversely long chassis frame body and the front axle or the rear axle, and the transmission integrally formed with said engine is inserted and arranged in a space in a lower side of the frame body; and
wherein said transmission portion is disposed between said engine and said bevel gear output portion.

2. A wheel traveling and operating vehicle as claimed in claim 1,
wherein the engine mounted to a side portion of either a right side or a left side of said transversely long chassis frame body having the box-shaped cross section is inserted and mounted with part of an engine flywheel housing to a bottom surface of the transversely long chassis frame body.

3. A wheel traveling and operating vehicle as claimed in claim 1,
wherein said transversely long chassis frame body having the box-shaped cross section has cantilever stands suspended downward respectively in right and left side portions of the frame body between a front wheel and a rear wheel, the integrally formed engine and transmission and a radiator are mounted on one stand, and said working fluid tank and said fuel tank are mounted on another stand, respectively.

4. A wheel traveling and operating vehicle as claimed in claim 1 or 2,
wherein the transmission portion of said transmission is a vertically flat multi-shaft transmission portion in which said transmission input shaft, an intermediate shaft provided with rotary clutches and said transmission output shaft are arranged in parallel so as to be in the transverse direction of the axis (X—X) at a position in a forward and backward direction of the axis (X—X) in the vehicle longitudinal direction in parallel to each other,
the bevel gear output portion of said transmission is provided in a side surface of one side of right and left sides in a housing external portion of the vertically flat multi-shaft transmission portion, and is connected to said transmission output shaft so as to output front and rear tire wheel driving power in a perpendicular direction of said transmission input shaft.

5. A wheel traveling and operating vehicle as claimed in claim 3,
wherein said transmission has a hydraulic pump connected to said transmission input shaft, a hydraulic motor connected to said hydraulic pump by a hydraulic circuit, a second input shaft inputting a rotation of said hydraulic motor, and a rotary clutch selectively connecting the second input shaft and said transmission output shaft, and includes a hydraulic power transmitting transmission portion selectively outputting a hydraulic rotary power to said transmission output shaft.

6. A wheel traveling and operating vehicle as claimed in claim 4,
wherein the transmission includes a hydraulic power transmitting transmission portion in which the bevel gear output portion connected to said transmission output shaft is arranged with a step in a lower side from the hydraulic pump and the hydraulic motor which are respectively connected to said transmission input shaft and a second input shaft.

7. A wheel traveling and operating vehicle as claimed in claim 3 or 5, wherein said bevel gear output portion is provided with a clutch mechanism which always transmits rotation power to a rear output shaft in a rear side of the vehicle,
and selectively transmits the rotation power to a front output shaft in a front side of the vehicle.

* * * * *